US009467909B2

(12) United States Patent
Faerber et al.

(10) Patent No.: US 9,467,909 B2
(45) Date of Patent: Oct. 11, 2016

(54) TECHNIQUES FOR RELOCATING A BACKHAUL CHANNEL BETWEEN A SMALL CELL BASE STATION AND A MACRO CELL BASE STATION

(71) Applicant: Intel IP Corporation, Santa Clara, CA (US)

(72) Inventors: Michael Faerber, Wolfratshausen (DE); Martin Hans, Braunschweig (DE); Andreas Schmidt, Braunschweig (DE); Maik Bienas, Braunschweig (DE)

(73) Assignee: INTEL IP CORPORATION, Santa Clara, CA (US)

( * ) Notice: Subject to any disclaimer, the term of this patent is extended or adjusted under 35 U.S.C. 154(b) by 193 days.

(21) Appl. No.: 14/227,916

(22) Filed: Mar. 27, 2014

(65) Prior Publication Data

US 2015/0071248 A1 Mar. 12, 2015

Related U.S. Application Data

(60) Provisional application No. 61/876,699, filed on Sep. 11, 2013.

(51) Int. Cl.
*H04W 4/00* (2009.01)
*H04B 7/14* (2006.01)
*H04W 36/00* (2009.01)
*H04W 84/04* (2009.01)
*H04W 92/20* (2009.01)
*H04W 36/08* (2009.01)

(52) U.S. Cl.
CPC ......... *H04W 36/0055* (2013.01); *H04W 36/08* (2013.01); *H04W 84/045* (2013.01); *H04W 92/20* (2013.01)

(58) Field of Classification Search
CPC ........... H04W 36/0055; H04W 36/08; H04W 36/04; H04W 84/045; H04W 92/00
See application file for complete search history.

(56) References Cited

U.S. PATENT DOCUMENTS

| 2004/0252660 | A1* | 12/2004 | Ahmavaara | ................... 370/328 |
| 2012/0057580 | A1* | 3/2012 | Hansen et al. | ................ 370/338 |
| 2012/0082084 | A1* | 4/2012 | Balakrishnan et al. | ...... 370/315 |
| 2014/0187247 | A1* | 7/2014 | Sarkar et al. | ................. 455/437 |

* cited by examiner

Primary Examiner — Kiet Tang

(57) ABSTRACT

Examples are disclosed for handover/relocation of a backhaul channel between a small cell base station and a macro cell base station. The handover/relocation may be responsive to possibly changing conditions associated with a wireless link over which the backhaul channel may be established. Other examples are described and claimed.

24 Claims, 13 Drawing Sheets

*Message Format 400*

| Identification Information 410 | Capability Information 420 | Backhaul Needs 430 |
|---|---|---|

*FIG. 4*

*Storage Medium 800*

*Computer Executable Instructions for 700*

- ESTABLISH A BACKHAUL CHANNEL WITH A SMALL CELL BASE STATION OVER A FIRST WIRELESS LINK
  *1002*
- RECEIVE AN INDICATION OF RELOCATION
  *1004*
- IDENTIFY A RELOCATION TARGET
  *1006*
- INITIATE RELOCATION
  *1008*
- RECEIVE ACCEPTANCE OF RELOCATION FROM THE RELOCATION TARGET
  *1010*
- FORWARD A COPY OF A BACKHAUL DATA STREAM TO THE RELOCATION TARGET
  *1012*
- RECEIVE RESOURCE ALLOCATION AND TIMING INFORMATION AND FORWARD TO SMALL CELL BASE STATION
  *1014*
- TERMINATE THE FIRST WIRELESS LINK
  *1016*
- REALLOCATE RESOURCES
  *1018*

*FIG. 10*

Storage Medium 1100

Computer Executable Instructions for 1000

*FIG. 11*

TECHNIQUES FOR RELOCATING A BACKHAUL CHANNEL BETWEEN A SMALL CELL BASE STATION AND A MACRO CELL BASE STATION

CROSS-REFERENCE TO RELATED APPLICATIONS

This application claims priority to U.S. Provisional Patent Application No. 61/876,699, filed on Sep. 11, 2013, that is hereby incorporated by reference in its entirety.

TECHNICAL FIELD

Examples described herein are generally related to wireless communication devices.

BACKGROUND

Widespread availability and use of certain types of digital multimedia content has placed expanding demands on wireless data networks. In particular, geographical areas having a high concentration of users often result in severe degradation in user available bandwidth as resources may not keep up with the expanding demands. Also, licensed spectrum continues to be a scarcer and more expensive solution to meeting increased demand. One solution that may more efficiently utilize licensed spectrum is deploying a denser cell topology. The denser cell topology may allow the same capacity to be served to a smaller region or a fewer number of users. These cells are commonly known as small or booster cells. A small cell may help to distribute or boost capacity to users in a small geographic area relative to a larger geographic area of a macro or anchor cell that may encompass one or more small cells.

BRIEF DESCRIPTION OF THE DRAWINGS

FIG. 4 illustrates an example message format.
FIG. 8 illustrates an example of a first storage medium.
FIG. 10 illustrates an example of a second logic flow.
FIG. 11 illustrates an example of a second storage medium.

DETAILED DESCRIPTION

Figure 1:
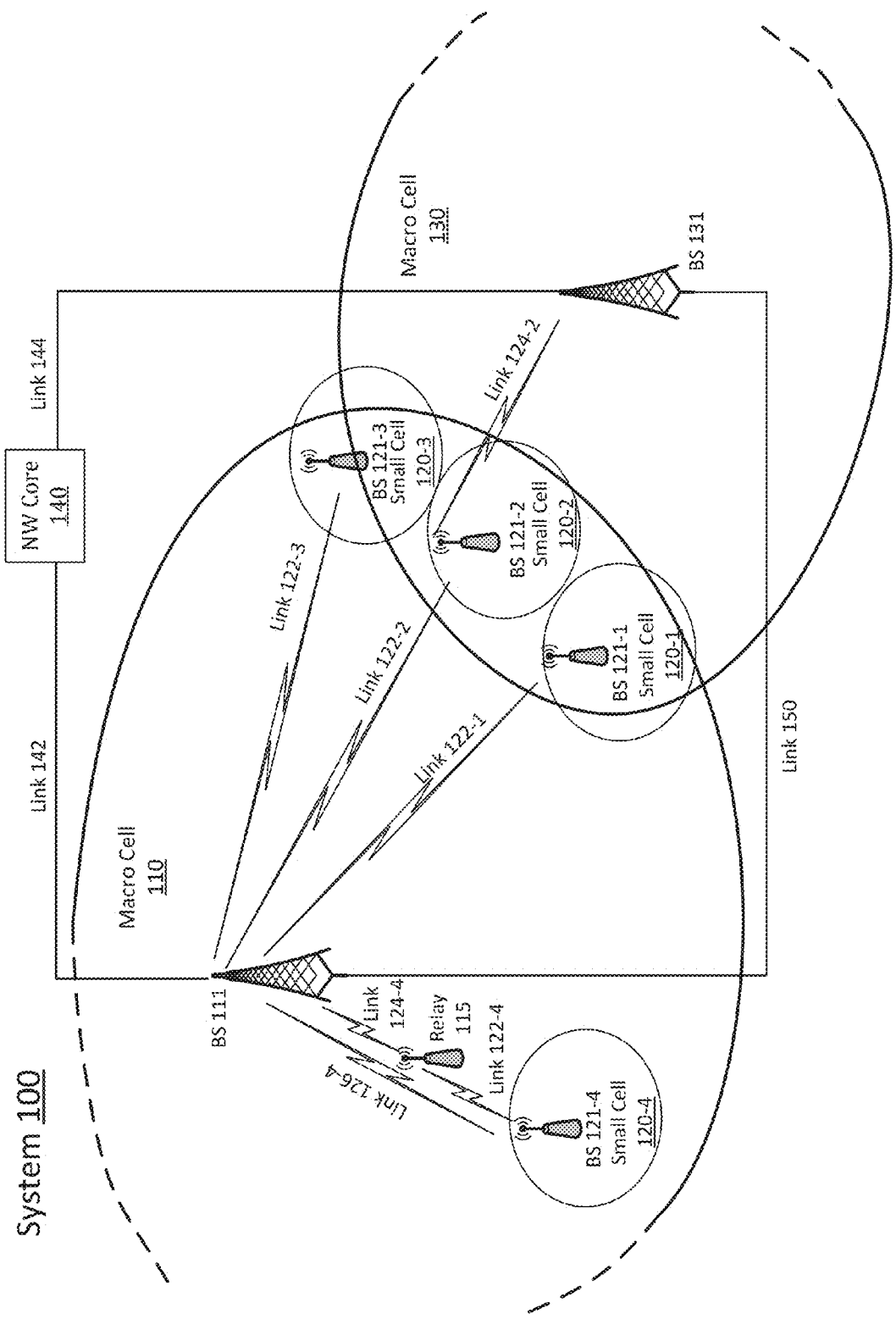
FIG. 1 illustrates an example first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

In some examples, types of wireless links associated with extremely high frequency radio signals may sometimes be referred to as millimeter wave (mmWave) wireless links. Some types of mmWave wireless links may allow for large bandwidth or data capacity for a given mmWave wireless link established between wireless devices over a relatively short distance (e.g., less than a kilometer). Types of mmWave wireless links may be established and/or maintained through various frequency bands to include those associated with WiGig™ frequency bands, e.g., between 57-64 gigahertz (GHz) or those associated with other frequency bands such as between 20-30 GHz or even possibly between 20-75 GHz. These types of mmWave wireless links may utilize technologies as described in various standards promulgated by IEEE or 3GPP. For example, wireless Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). One such standard related to WiGig and use of the 57-64 GHz frequency band is IEEE 802.1 lad.

As contemplated in the present disclosure, a small or booster cell may help to distribute or boost capacity to users in a small geographic area relative to a larger geographic area of a macro or anchor cell that may encompass one or more small cells. In some examples, a small cell base station may connect to a macro cell base station through one or more mmWave wireless links to establish a backhaul channel with the macro cell. The connection may be a direct connection or may have multiple hops routed through at least one relay base station or relay device. User equipment (UEs) located within the small cell's service area may share mmWave radio resources and thus the mmWave wireless link(s) may be capable of having a spectrum range or frequency band well suited to support large bandwidths or data capacity. A common frequency band being contemplated for use for mmWave wireless links may include those in the 20-30 GHz or the 57-64 GHz frequency bands. Depending on future spectrum allocations by the ITU, and allocations by national or regional regulatory bodies, other spectra may be allocated for types of mmWave wireless links. Therefore this disclosure is not limited to a specific frequency band, as long as the spectra allocations are capable of supporting a large bandwidth and low wireless link.

Use of frequency bands such as 20-30 GHz or 57-64 GHz may provide frequency bands well suited to support a large bandwidth. However, these frequency bands may be subject to strong variations in signal propagation conditions, often caused by atmospheric changes. For example, the 20-30 GHz frequency band may have signal propagation conditions that are sensitive to moisture or H2O content in the air. Also, the 57-64 GHz frequency band may have signal propagation conditions that are sensitive to O2 levels in the air. Depending on a particular geography's weather patterns or elevation, H2O content or O2 levels in the air may vary significantly.

The 20-30 GHz or the 57-64 GHz frequency bands used for mmWave wireless links typically may be transmitted/received using highly directional and line-of-site dependent antenna arrays. Seasonal foliage changes or temporary physical environment changes such as construction equipment may block line-of-site pathways for these types of antenna. Thus, signal propagation conditions may have further variations. As a result of at least some of the variations mentioned above, an initially selected mmWave wireless link to a given macro cell base station that may have had optimal conditions when first established for a backhaul channel may degrade due to these variations and change to suboptimal conditions. It is with respect to these and other challenges that the examples described herein are needed.

In some examples, techniques are implemented for relocating a backhaul link between a small cell base station and a macro cell base station. The techniques may include example methods for establishing a backhaul channel between a small cell base station and a first macro cell base station over a first wireless link (e.g., a first mmWave wireless link). For these example methods, an indication may be received that the backhaul channel is to be relocated over a second wireless link (e.g., a second mmWave wireless link) with the first macro cell base station or with a second macro cell base station, e.g., due to changing propagation conditions. Also, for these example methods, the backhaul channel may be relocated over the second wireless link based, at least in part, on one or more handover procedures.

FIG. 1 illustrates an example of a system 100. In some examples, as shown in FIG. 1, the system 100 includes macro cells 110 and 130 having base stations (BSs) 111 and 131, respectively. Also, as shown in FIG. 1, small cells 120-1 to 120-4 may be included in or encompassed by macro cell 110 and each have respective BSs 121-1 to 121-4. According to some examples, as shown in FIG. 1, BSs 121-1 to 121-3 may separately couple with BS 111 via respective links 122-1, 122-2 and 122-3. Also, as shown in FIG. 1, BS 121-4 may couple to BS 111 either directly via link 126-4 or indirectly through a relay 115 via links 122-4 and 124-4. Also, in some examples, BS 121-2 may be capable of also coupling to BS 131 via link 124-2.

According to some examples, links 122-1 to 122-4, 124-2, 124-4 or 126-4 may each be capable of supporting a backhaul channel between a small cell BS and a macro cell BS. For these examples, links 122-1 to 122-4, 124-2, 124-4 or 126-4 may be arranged to operate as mmWave wireless links in either a 57-64 GHz or 20-30 GHz radio frequency band. For example, BS 121-2 of small cell 120-2 may establish a backhaul channel with BS 111 of macro cell 110 over link 122-2 arranged to operate as an mmWave wireless link. As described more below, logic and/or features at a small cell BS or at a macro cell BS may handover or relocate an established backhaul channel over different links responsive to changing environmental, network traffic or network management conditions.

In some examples, as shown in FIG. 1, BS 111 and BS 131 may have respective links 142 and 144 to a network (NW) core 140. For these examples, logic and/or features at NW core 140 may be capable of communicating with BS 111 and BS 131 via these links. Communicating via links 142 and 144 may include managing or controlling network actions or operations such as relocating backhaul channels over first and second mmWave wireless links between macro base stations and small cells.

According to some examples, system 100 may be capable of operating according to one or more 3GPP LTE standards including, but not limited to LTE-A. For these examples, NW core 140 may be an evolved packet core (EPC) and at least BSs 111 and 131 may be evolved node Bs (eNBs). Also, links 142 and 144 may be arranged to communicate using S1 protocols and/or S1 control plane interfaces (e.g., via an S1-MME interface).

Also, as shown in FIG. 1, a link 150 may directly couple BS 111 to BS 131. As described in more detail below, in some examples, base stations such as BS 111 and BS 131 may coordinate relocation of backhaul channels via exchange of information over link 150. In some examples where BS 111 and BS 131 are arranged to operate as eNBs, link 150 may be arranged to operate as an X2 channel.

In some examples, small cells 120-1 to 120-3 may be located at the edge of macro cell 110 to provide a boost to data bandwidth capabilities for macro cell 110 to one or more UEs located within or near any of these three small cells. In that regard, the base stations for small cells 120-1 to 120-3 may be referred to as booster base stations. Also, BS 111 of macro cell 110 may be referred to as an anchor base station. BS 131 for macro cell 130 may similarly be referred to as an anchor base station.

According to some examples, small cell 120-4 may be located in an area having a high density of UEs and/or possibly in an area having a high level of interference that degrades signals to UEs in that area. The high density of UEs and/or high level of interference, for example, may require use of relay 115 to provide multi-hop links through links 122-4 and 124-4. Relay 115 may provide a temporary relay to reduce possible path loss via shorter links. The short links 122-4 and 124-4 may allow for operation of higher order modulation and coding schemes (MCS). For example, during times of peak usage at a location such as an office building during business hours. Outside of business hours, relay 115 may be powered down and an established backhaul link between BS 121-4 and BS 111 may be relocated to link 126-4. Even with the interference, data bandwidth or throughput needs may be reduced outside of business hours and link 126-4 may provide an acceptable mmWave wireless link. Once business hours return, the backhaul link between BS 121-4 and BS 111 may be relocated again over links 122-4 and 124-4.

In some examples, BSs 121-1 to 121-4 for small cells 120-1 to 120-4 may provide wireless access to one or more UEs located at or near these small cells based on WWAN technologies such as 3GPP LTE or LTE-A and/or based on types of mmWave technologies such as WiGig/IEEE 802.11ad, e.g., at 60 GHz. Also, although not shown in FIG. 1, some small cell base stations may also be capable of functioning as a relay for other small cells.

According to some examples, as mentioned above, conditions under which an mmWave link used for a given backhaul channel between a small cell base station and a macro cell base station may change. For example, BS 121-2 may have established a backhaul channel over link 122-2 with BS 111. Temporary environmental conditions such as changes in the weather (e.g., drier, wetter, colder, hotter, etc.) or temporary construction or other types of temporary line-of-sight obstructions may degrade link 122-2 with BS 111. Also, seasonal environmental conditions such as the onset of winter, spring, summer or fall may result in a more lasting and predictable environmental changes and may be expected to degrade link 122-2. Also, network traffic or UE usage patterns may have bursts that may be expected (e.g. office business hours) or unexpected (e.g., large number of transient UEs entered service area). As described in more detail below, logic and/or features at BS 121-2 or at BS 111 may recognize/detect or expect degradation associated with expected/unexpected bursts and initiate a relocation of the backhaul channel to another macro cell base station. That relocation, for example may be over link 124-2 to BS 131.

According to some examples, BSs 121-1 to 121-4 for small cells 120-1 to 120-4 may have various ways to obtain or acquire information regarding possible target macro cell base stations via which a backhaul channel may be relocated. One way to acquire information may be via conventional mobile radio technology such as described by one or more 3GPP LTE standards including LTE-A—scanning radio resources regularly and creating a list of suitable macro cell base stations. For these ways, a suitable macro cell base station may be an mmWave link that provides a reliable signal with adequate throughput capabilities to support UEs serviced by the small cell base station. The created list may be shared with the current coupled macro base station. This macro base station may then provide geographical data of the monitored other macro cells. The geographical data may then allow the small cell base station to direct its mmWave antenna to a given other macro cell base station when relocation of the backhaul link is arranged.

In some examples, another way to obtain or acquire information regarding possible target macro cell base stations may include UEs serviced by given small cell base stations scanning radio resources regularly and creating a list of suitable macro cell base stations. This list may be reported through a given UEs small cell base station to the current coupled macro base station. Geographic information may then be provided by the coupled macro base station as mentioned above to enable a small cell base station to direct its mmWave antenna.

According to some examples, another way to obtain or acquire information regarding possible target macro cell base stations may include use of a neighbor list of macro cell base stations created by a cell planning tool. The cell planning tool, for example, may be implemented by an operations, administration and maintenance (OAM) system (e.g., located with NW core 140. The OAM system may provide the neighbor list to the macro cell base stations to enable them to identify their neighbors. Relevant information from the neighbor list may then be cascaded to small cell base stations from the macro cell base stations.

In some examples, another way for small cell base stations to obtain or acquire information regarding possible target macro cell base stations may be via implementing self-organizing network (SON) algorithms or automatic neighbor relation (ANR) methods. Examples are not limited to the above mentioned ways to obtain or acquire information for target macro cell base stations.

According to some examples, small cell base stations such as BS 121-1 to 121-4 may be arranged to have high gain directive antennas that may be composed by planar antenna arrays. For these examples, electrical phase shift elements can be used to change a main lobe direction. By combining several planar components, the main lobe may be turned 360°. As a result of being able to be turned 360°, these high gain directive antennas may be considered as steerable.

According to some examples, the logic and/or features at BSs 111, 131 or 121-1 to 121-4 may include system equipment, such as network equipment for a communications system or network compliant with one or more 3GPP LTE Specifications (e.g., LTE-A). For example, these base stations may be implemented as evolved Node B (eNB) base stations or remote radio heads for a Wireless LTE or LTE-A network. Although some examples are described with reference to a base station, eNB or remote radio head, embodiments may utilize any network equipment for a wireless network. The examples are not limited in this context.

Figure 2:
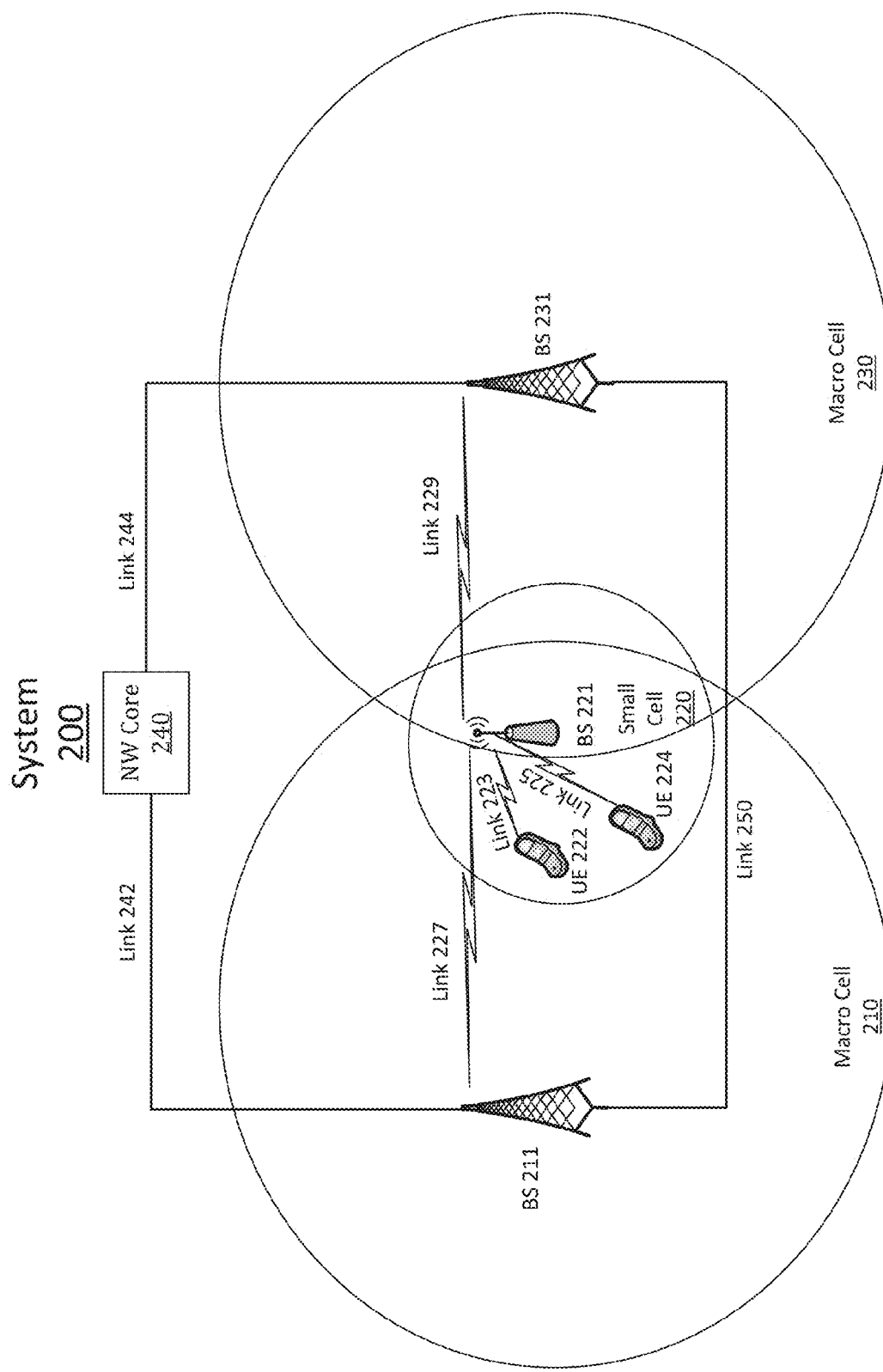
FIG. 2 illustrates an example second system.

FIG. 2 illustrates an example system 200. According to some examples, as shown in FIG. 2, system 200 includes macro cells 210 and 230 as well as a small cell 220. Also, as shown in FIG. 2, macro cells 210 and 230 include respective BSs 211 and 231 coupled together via a link 250 and coupled to a NW core 240 via respective links 242 and 244.

In some examples, similar to BS 121-2 for small cell 120-2 shown in FIG. 1, BS 221 for small cell 220 may establish a backhaul channel with BS 211 over two different links, links 227 or 229. The backhaul channel may be used to provide network access to UEs 224 and 224 coupled to BS 221 via respective links 223 and 225. Links 227 and 229 may arranged to operate as mmWave wireless links in either a 57-64 GHz or 20-30 GHz radio frequency band. Links 223 or 225 may be arranged to operate according to one or more 3GPP LTE standards including LTE-A. Links 223 or 225 may also be arranged to operate according to an IEEE 802.11 standard such as IEEE 802.11 ad that may utilize a 60 GHz mmWave wireless link.

According to some examples, BS 211, BS 231 and NW core 240 may be arranged to operate as eNBs in accordance with one or more 3GPP LTE standards including LTE-A. For these examples, link 250 may be capable of operating as an X2 channel and links 242 or 244 may be arranged to enable BSs 211 and 231 to communicate with NW core 240 via use of S1 protocols.

In some examples, small cell 220 may provide booster capabilities to UEs 222 or 224 via establishment of a backhaul channel over a first mmWave wireless link such as link 227. The established backhaul channel may be relocated over a second mmWave wireless link such as link 229. As described in more detail below, logic and/or features located at BS 211, BS 231, NW core 240 or BS 221 may be capable of facilitating the relocation of the backhaul channel.

Figure 3:
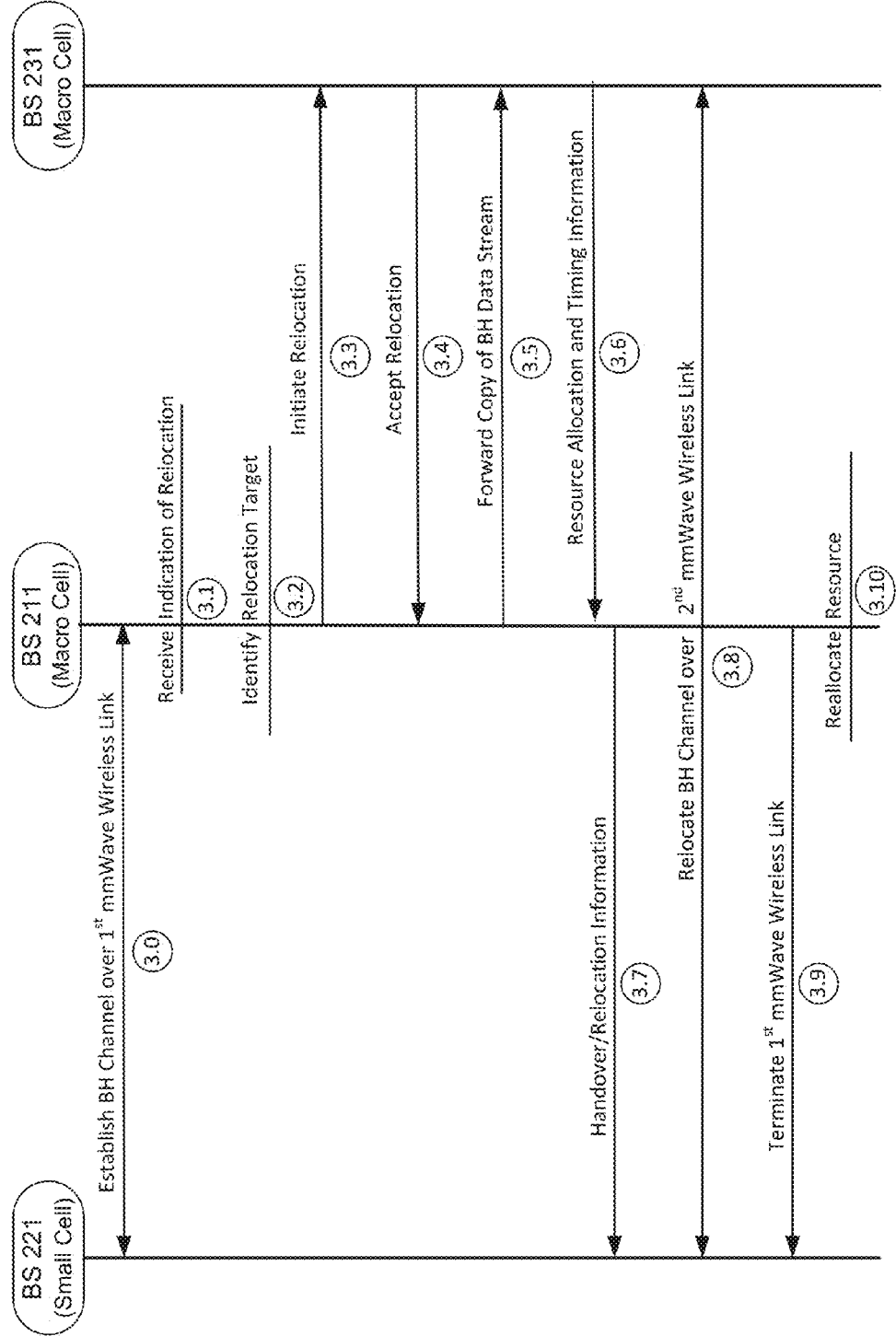
FIG. 3 illustrates an example first process.

FIG. 3 illustrates an example process 300. In some examples, process 300 may be a first example process for relocating a backhaul channel between a small cell base station and a macro cell base station. For these examples, elements of system 200 as shown in FIG. 2 may be used to illustrate example operations related to process 300. However, the example processes or operations are not limited to implementations using elements of system 200.

Beginning at process 3.0 (Establish BH Channel over a 1st mmWave Wireless Link), logic and/or features at BS 221 and BS 211 may establish a backhaul (BH) channel over a first mmWave wireless link. In some examples, the BH channel may be established over link 227 arranged to operate as an mmWave wireless link.

Proceeding to process 3.1 (Receive Indication of Relocation), logic and/or features at BS 211 may receive an indication that the BH channel over link 227 needs to be relocated. According to some examples, conditions to maintain an acceptable mmWave wireless link via link 227 may be less than desired. For example, a load capacity for BS 211 to service all UEs within macro cell 210 may be exceeded and thus throughputs for link 227 may be lowered below a desired level in order to meet pre-established quality of service (QoS) requirements or conditions. Similarly, a load capacity for link 242 for connection of BS 211 to NW core 240 may be exceeded. In other examples, environmental factors such as weather or seasonal changes may have negatively impacted the conditions to maintain an acceptable mmWave wireless link. In yet other examples, logic and/or features at NW core 240 may want to load balance or shift some capacity from macro cell 210 to another macro cell due to anticipated or expected load changes.

Proceeding to process 3.2 (Identify Relocation Target), logic and/or features at BS 211 may identify a relocation target via which another mmWave wireless link may be established. According to some examples, the logic and/or features at BS 211 may have previously created a neighbor list of acceptable neighbors and may have identified BS 231 of macro cell 230 as being capable of supporting an acceptable mmWave wireless link for a BH channel. In some other examples, logic and/or features at NW core 240 may assist the logic and/or features at BS 211 in identifying a relocation target.

Proceeding to process 3.3 (Initiate Relocation), logic and/or features at BS 211 may initiate relocation of the BH channel. In some examples, the logic and/or features at BS 211 may send a request over link 250 through an X2 compliant interface using X2 compliant protocols to place the request. The request may include information such as possible radio resources BS 221 may need for the BH channel and to support UEs 222 and 224.

Proceeding to process 3.4 (Accept Relocation), logic and/or features at BS 231 may accept the relocation. According to some examples, the logic and/or features at BS 231 may determine whether adequate radio resources are available to support the BH channel over an mmWave wireless link before accepting the relocation. Indication of acceptance may be communicated over link 250 through an X2 compliant interface using X2 compliant protocols.

Proceeding to process 3.5 (Forward Copy of BH Data Stream), logic and/or features at BS 211 may forward a copy of a BH data stream currently mapped to the first mmWave wireless link on link 227. In some examples, the BH data stream may be forward over link 250 through the X2 compliant interface using X2 compliant protocols.

Proceeding to process 3.6 (Resource Allocation and Timing Information), logic and/or features at BS 231 may provide resource allocation and timing information to logic and/or features at BS 211. According to some examples, BS 231 may inform BS 211 about an intended radio resource allocation for BS 221 and an absolute or relative time reference for a handover/relocation of the BH channel over link 227. This information may be provided over link 250 through the X2 compliant interface using X2 compliant protocols.

Proceeding to process 3.7 (Handover/Relocation Information), logic and/or features at BS 211 may forward the handover/relocation information to logic and/or features at BS 221. In some examples, the handover/relocation information may include resource allocation information as well as the relative or absolute time reference for the handover/relocation. The handover/relocation information may also include geographic information via which the logic and/or features at BS 221 may redirect antennas to support a second mmWave wireless link on link 227. For these examples, the handover/relocation information may be forwarded over link 227.

Proceeding to process 3.8 (Relocate BH Channel over 2nd mmWave Wireless Link), logic and/or features at BS 231 and BS 221 may relocate the BH channel over a second mmWave wireless link on link 229.

Proceeding to process 3.9 (Terminate 1st mmWave Wireless Link), logic and/or features at BS 221 may terminate the first mmWave wireless link on link 227.

Proceeding to process 3.10 (Reallocate Resource), logic and/or features at BS 221 may reallocate radio resources previously used to support the first mmWave wireless link on link 227.

FIG. 4 illustrates an example message format 400. According to some examples, message format 400 may be a message format used by a small cell base station to directly initiate a request for a handover/relocation from a first macro cell base station to a second macro cell base station. As shown in FIG. 4, message format 400 includes an identification information field 410, a capability information field 420 and a backhaul needs field 430.

In some examples, a small cell base station may be capable of sending out a random access channel (RACH) burst that may include a request message for relocating a backhaul channel over an mmWave wireless link. The request message may be in the example message format 400. For these examples, identification information field 410 may include an assigned and/or unique identifier for the small cell base station. Capability information 420 may indicate the small cell base station's capabilities (e.g., relay, LTE access points, IEEE 802.11ad access points, class mark, etc.). Backhaul needs 430 may indicate capacity or radio resource needs to support the UEs serviced by or expected to be served by the small cell base station.

Figure 5:
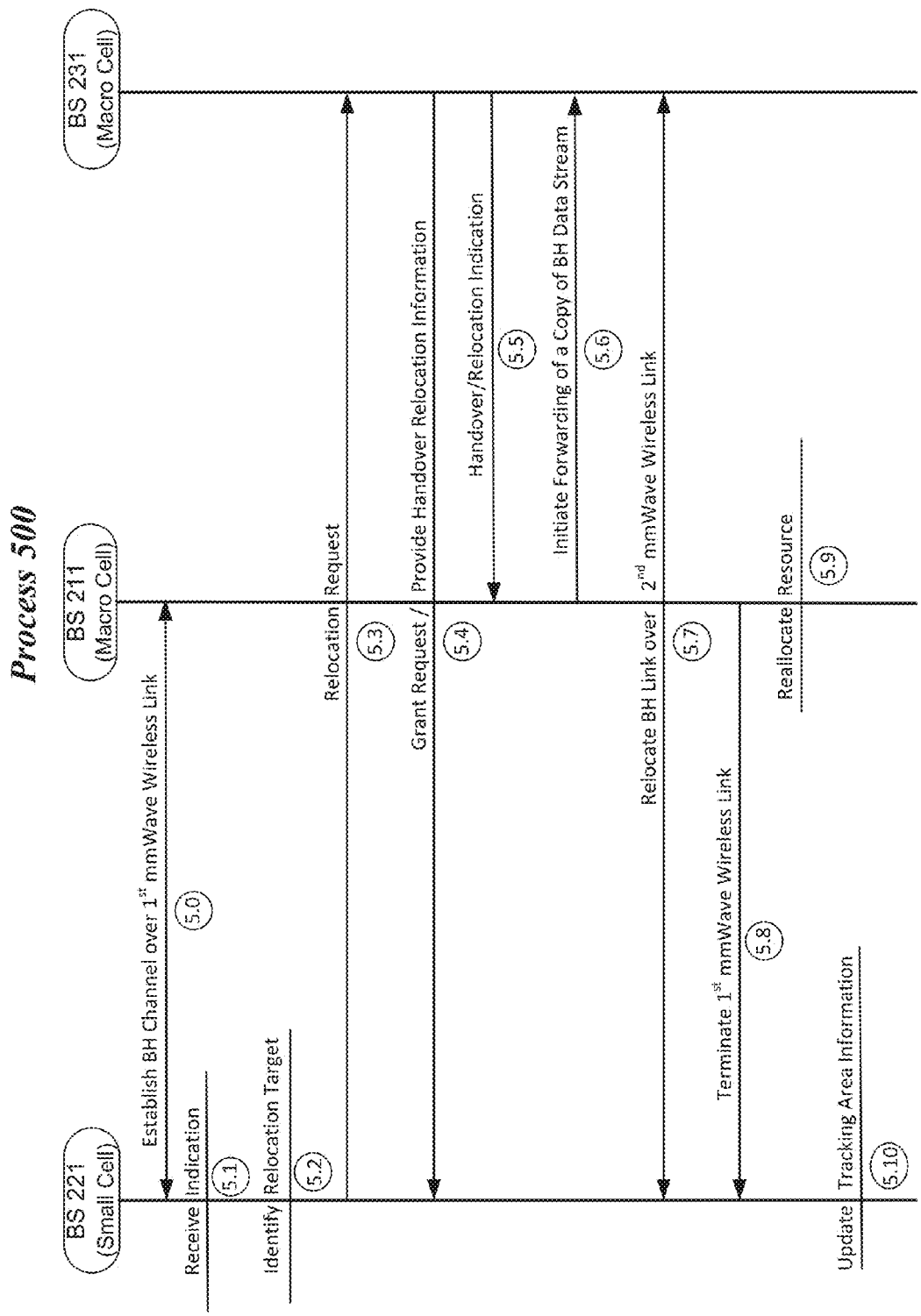
FIG. 5 illustrates an example second process.

FIG. 5 illustrates an example process 500. In some examples, process 500 may be a second example process for relocating a backhaul channel between a small cell base station and a macro cell base station. For these examples, elements of system 200 as shown in FIG. 2 and example message format 400 in FIG. 4 may be used to illustrate example operations related to process 500. However, the example processes or operations are not limited to implementations using elements of system 200 or of message format 400.

Beginning at process 5.0 (Establish BH Channel over a 1st mmWave Wireless Link), logic and/or features at BS 221 and BS 211 may establish a backhaul (BH) channel over a first mmWave wireless link. In some examples, the BH channel may be established over link 227 arranged to operate as an mmWave wireless link.

Proceeding to process 5.1 (Receive Indication of Relocation), logic and/or features at BS 221 may receive an indication that the BH channel over link 227 needs to be relocated. According to some examples, conditions to maintain an acceptable mmWave wireless link via link 227 may be less than desired. For example, a load capacity for BS 211 to service all UEs or other possible small cell base stations within macro cell 210 (not shown in FIG. 2) may exceed a load capacity threshold and cause the throughputs for link 227 to be lowered below a required throughput level or threshold level to meet one or more QoS requirements. Similarly, a load capacity for Link 242 for connection of BS 211 to NW core 240 may be exceeded. In other examples, environmental factors may have negatively impacted the conditions to maintain an acceptable mmWave wireless link. In yet other examples, logic and/or features at BS 211 may indicate a plan or schedule to shift some capacity away from BS 221 that will lower throughputs below the required throughput level to meet the one or more QoS requirements.

Proceeding to process 5.2 (Identify Relocation Target), logic and/or features at BS 221 may identify a relocation target via which another mmWave wireless link may be established. According to some examples, the logic and/or features at BS 221 may have previously created a list of acceptable targets and may have identified BS 231 of macro cell 230 as being capable of supporting an acceptable mmWave wireless link for a BH channel. In some other examples, logic and/or features at BS 211 may assist the logic and/or features at BS 221 in identifying a relocation target.

Proceeding to process 5.3 (Relocation Request), logic and/or features at BS 221 may initiate relocation of the BH channel by sending a relocation request to BS 231. In some examples, the logic and/or features at BS 221 may send a request in an RACH burst having a request message in a format similar to example message format 400.

Proceeding to process 5.4 (Grant Request/Provide Handover/Relocation Information), logic and/or features at BS 231 may grant the request and provide handover/relocation information. According to some examples, the logic and/or features at BS 231 may determine whether adequate radio resources are available to support the BH channel over an mmWave wireless link before granting the request. The logic and/or features at BS 231 may also provide handover/relocation information that may indicate absolute or relative times that the relocation over link 229 may occur.

Proceeding to process 5.5 (Handover/Relocation Indication), logic and/or features at BS 231 may provide an indication to logic and/or features at BS 211 that a handover/relocation is imminent for relocating the BH channel from link 227 to link 229. According to some examples, BS 231 may inform BS 211 about intended radio resource allocation for BS 221 and an absolute or relative time reference for a handover/relocation of the BH channel over link 227. This information may be provided over link 250 through the X2 compliant interface using X2 compliant protocols.

Proceeding to process 5.6 (Forwarding of a Copy of BH Data Stream), logic and/or features at BS 211 may forward to BS 231 a copy of a BH data stream currently mapped to the first mmWave wireless link on link 227. In some examples, the BH data stream may be forward over link 250 through the X2 compliant interface using X2 compliant protocols.

Proceeding to process 5.7 (Relocate BH Channel over 2nd mmWave Wireless Link), logic and/or features at BS 231 and BS 221 may relocate the BH channel over a second mmWave wireless link on link 229.

Proceeding to process 5.8 (Terminate 1st mmWave Wireless Link), logic and/or features at BS 221 may terminate the first mmWave wireless link on link 227.

Proceeding to process 5.9 (Reallocate Resource), logic and/or features at BS 221 may reallocate radio resources previously used to support the first mmWave wireless link on link 227.

Proceeding to process 5.10 (Update Tracking Area Information), logic and/or feature at BS 221 may update tracking area (TA) information and routing information. In some examples, UEs may be generally served by BS 221 and may be either connected to BS 221 (e.g., via LTE and/or mmWave wireless links) or camping on BS 221's small cell. It may be possible that BS 231 has a different TA than BS 211. BS 221 may not have its own cell identification (cell-id). In other words, BS 221 may span its own small cell 220 or may simply replicate macro cell 210's. In that case a TA update (TAU) procedure may have to be initiated, either by BS 221 acting on behalf of a respective UE, or by the UEs themselves. In the latter case, a new notification from BS 221 to the UEs may be required to inform them about the changing TA. This may be needed in absence of UEs' normal trigger to detect changing TA and perform TAU based on a cell re-selection initiated by the UEs. In some examples, either BS 221, BS 211 or BS 231 may update routing information in NW core 240 in order to establish an effective NW route for data that is to be transmitted to UEs. This routing update may be performed at the same time or timely aligned to the BH channel handover or may be done after forwarding of the packets between BS 211 and BS 231 over an X2 interface/link has taken place for a certain time when more effective routing may be required or requested by any of the involved entities.

In some examples, UEs 222 or 224 may be operating in compliance with one or more 3GPP LTE standards such as LTE-A may have a split of the C- and U-plane and a split within the C- and/or U-Plane. With any of these scenarios it may occur that for any specific UE parallel connections to BS 211 or BS 231 may exist at the same time—one connection directly via the macro Cell and another connection via a small cell. This setup needs to be taken into account by BS 221 and BS 211/231 before possibly handing small cell BS 221 over to another small cell BS. There may be two approaches to solve this specific problem.

A first approach may be to dissolve the split connections for parallel macro cell and small cell connections to a pure connection to the macro cell (i.e. the UE is configured to have only one physical connection to the macro cell base station before the small cell base station is handed over). After that a handover/relocation or cell re-selection may be appropriate for the UE either to the small cell (now connected to another macro cell), or the new macro cell, or the connection stays within the previous macro cell and may utilize the newly freed radio resources in the previous macro cell.

A second approach may be to dissolve the split of connections for parallel macro cell and small cell connections to a pure booster connection before the booster handover (i.e. the UE is configured to have only one physical connection to the macro cell base station before this is handed over). After finalization of the handover/relocation of the macro cell a re-splitting of connections may be performed as appropriate.

A more sophisticated approach than the two above may be a handover of the part of the UE connection served by BS 211 to BS 231 (similar to legacy handover methods) while keeping the part of the connection served by the BS 221 (which is of course handed over to BS 231 as well during a small cell base station handover/relocation). This more sophisticated approach would require some additional signaling in the UE-macro cell BS-handover/relocation to identify the appropriate UE-small cell BS connection. A typical example would be that the C-plane is served by BS 211 and is handed over to BS 231 while the U-plane is served continuously by BS 221 who in turn changes from BS 211 to BS 231 in the course of the backhaul link handover/relocation. Some signaling in the handover/relocation procedures would have to identify the appropriate U-plane connection (RBs) and may include information about resources used for these U-plane connections towards BS 231. BS 231 may then decide to allocate the same resources, either implicitly or explicitly to the U-plane connection or may reconfigure the UE according to newly allocated resources.

Figure 6:
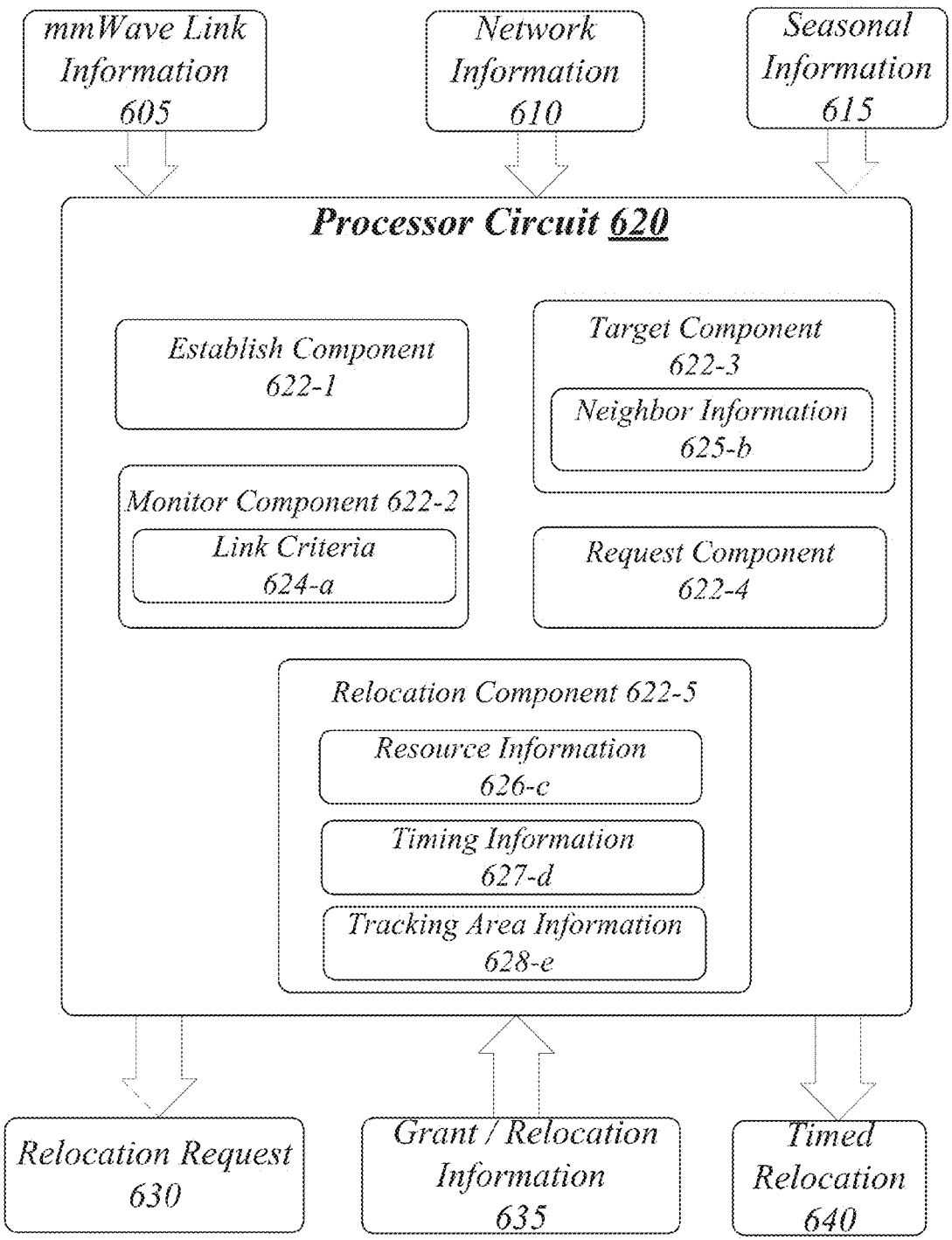
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may comprise a computer-implemented apparatus 600 having a processor circuit 620 arranged to execute one or more software components 622-*a*. It is worthy to note that "a" and "b" and "c" and similar designators as used herein are intended to be variables representing any positive integer. Thus, for example, if an implementation sets a value for a=5, then a complete set of software components 622-*a* may include components 622-1, 622-2, 622-3, 622-4 and 622-5. The examples are not limited in this context.

According to some examples, apparatus 600 may be located with system equipment (e.g., located at or with a base station), such as network equipment for a communications system or network compliant with one or more 3GPP LTE Specifications or IEEE 802.11 Specification such as IEEE 802.11 ad. For example, apparatus 600 may be implemented as part of a small cell base station or booster for an LTE and/or IEEE 802.11ad compliant wireless network. Although some examples are described with reference to a small cell base station or booster, examples may utilize any network equipment for a communications system or network. The examples are not limited in this context.

In some examples, as shown in FIG. 6, apparatus 600 includes processor circuit 620. Processor circuit 620 may be generally arranged to execute one or more software components 622-*a*. The processing circuit 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi processor architectures may also be employed as processing circuit 620. According to some examples, processor circuit 620 may also be an application specific integrated circuit (ASIC) and at least some components 622-*a* may be implemented as hardware elements of the ASIC.

According to some examples, apparatus 600 may include an establish component 622-1. Establish component 622-1 may be executed by processor circuit 620 to establish a backhaul channel between a small cell base station that includes an apparatus 600 and a macro cell base station. For these examples, the backhaul channel may be established over a first wireless link such as a first mmWave wireless link.

In some examples, apparatus 600 may also include a monitor component 622-2. Monitor component 622-2 may be executed by processor circuit 620 to monitor conditions associated with the first wireless link. For these examples, monitor component 622-2 may maintain link criteria 624-*a* in a data structure such as a lookup table (LUT). Link criteria 624-*a* may be associated with one or more QoS requirements (e.g., data throughputs, latency, available capacity, etc.) or other criteria that changing conditions may cause the requirements to not be met or potentially not met. The changing conditions may be received or monitored via mmWave link information 605, network information 610 or seasonal information 615 and may include but are not limited to line-of-site blockage for transceiver antennas, propagation delays, increased latencies due to NW congestion, high levels of measured interference or environmental conditions such as changing weather (e.g., rain or seasonal changes).

In some examples, apparatus 600 may also include a target component 622-3. Target component 622-3 may be executed by processor circuit 620 to identify a target macro cell base station via which a second mmWave wireless link may be established for the backhaul channel. For these examples, target component 622-3 may maintain neighbor information 625-*b* in a data structure such as LUT and use neighbor information 625-*b* to identify the target.

According to some examples, apparatus 600 may also include a request component 622-4. Request component 622-4 may be executed by processor circuit 620 to make a relocation request to the target identified by target component 622-3. The request may be include a message in the example message format 400. The request message may be included in relocation request 630.

In some examples, apparatus 600 may also include a relocation component 622-5. Relocation component 622-5 may be executed by processor circuit 620 to receive the grant for the relocation request from the identified target as well as receive handover/relocation information. The grant/information may be included in grant/relocation information 635. For these examples, relocation component 622-5 may maintain resource information 626-*c* (e.g., in a LUT) that may indicate the amount of resources needed to support the backhaul channel. If the handover/relocation information does not indicate adequate resources, relocation component 622-5 may not move forward with the relocation. If resources are adequate, relocation component 622-5 may at least temporarily maintain timing information 627-*d* (e.g., in a LUT) that includes absolute or relative timing information for the handover/relocation to the second mmWave wireless link. Timed relocation 640 may occur based on that absolute or relative timing information. Also, relocation component 622-5 may maintain tracking area information 628-*e* (e.g. in a LUT) for use in updating TA information for UEs being served by the small cell base station including apparatus 600 following the handover/relocation.

Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 7:
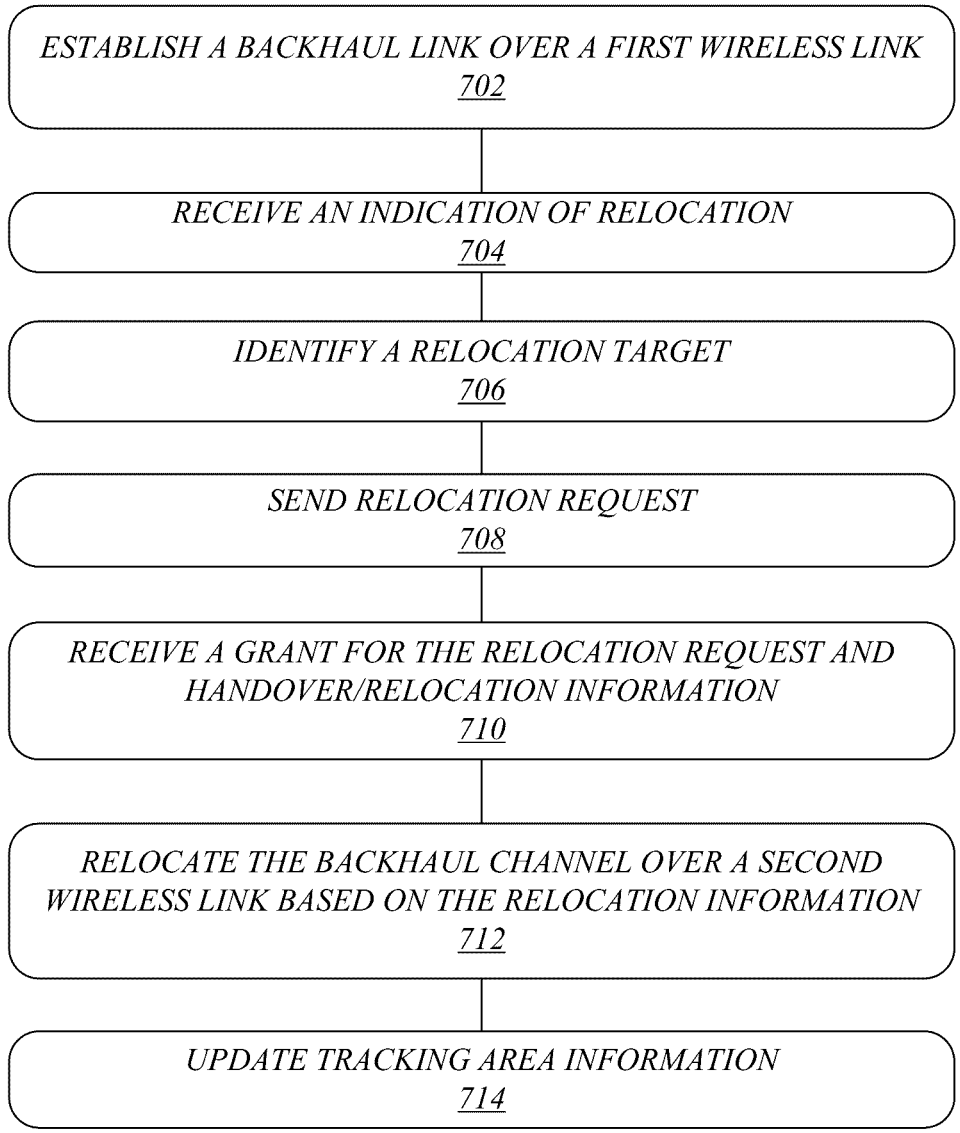
FIG. 7 illustrates an example of a first logic flow.

FIG. 7 illustrates an example of a logic flow 700. Logic flow 700 may be representative of some or all of the operations executed by one or more logic, features, or devices described herein, such as apparatus 600. More particularly, logic flow 700 may be implemented by establish component 622-1, monitor component 622-2, target component 622-3, request component 622-4 and relocation component 622-5.

In the illustrated example shown in FIG. 7, logic flow 700 at block 702 may establish a backhaul channel over a first wireless link. For example, establish component 622-1 may establish the backhaul channel with a macro cell base station over a first mmWave wireless link.

According to some examples, logic flow 700 at block 704 may receive an indication of relocation. For these examples, monitor component 622-2 may receive the indication. The indication may be based on monitored conditions of the first wireless link. The indication may also be received from the macro cell base station based on load balancing or resource constraints at the macro cell or network wide levels.

In some examples, logic flow 700 at block 706 may identify a relocation target. For these examples, target component 622-3 may identify the relocation target. In some other examples, the macro cell base station supporting the backhaul channel over the first wireless link may identify the relocation target as a neighbor macro cell base station and then provide that target information to target component 622-3.

According to some examples, logic flow 700 at block 708 may send a relocation request. For these examples, request component 622-4 may send the relocation request to the identified target.

In some examples, logic flow 700 at block 710 may receive a grant for the relocation request and handover/relocation information. For these examples, relocation component 622-5 may receive the grant and the handover/relocation information.

According to some examples, logic flow 700 at block 712 may relocate the backhaul channel over a second wireless link based on the received handover/relocation information. For these examples, relocation component 622-5 may execute the relocation.

In some examples, logic flow 700 at block 714 may update tracking area information. For these examples, relocation component 622-5 may be capable of coordinating with UEs served by the small cell base station to update TA information.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
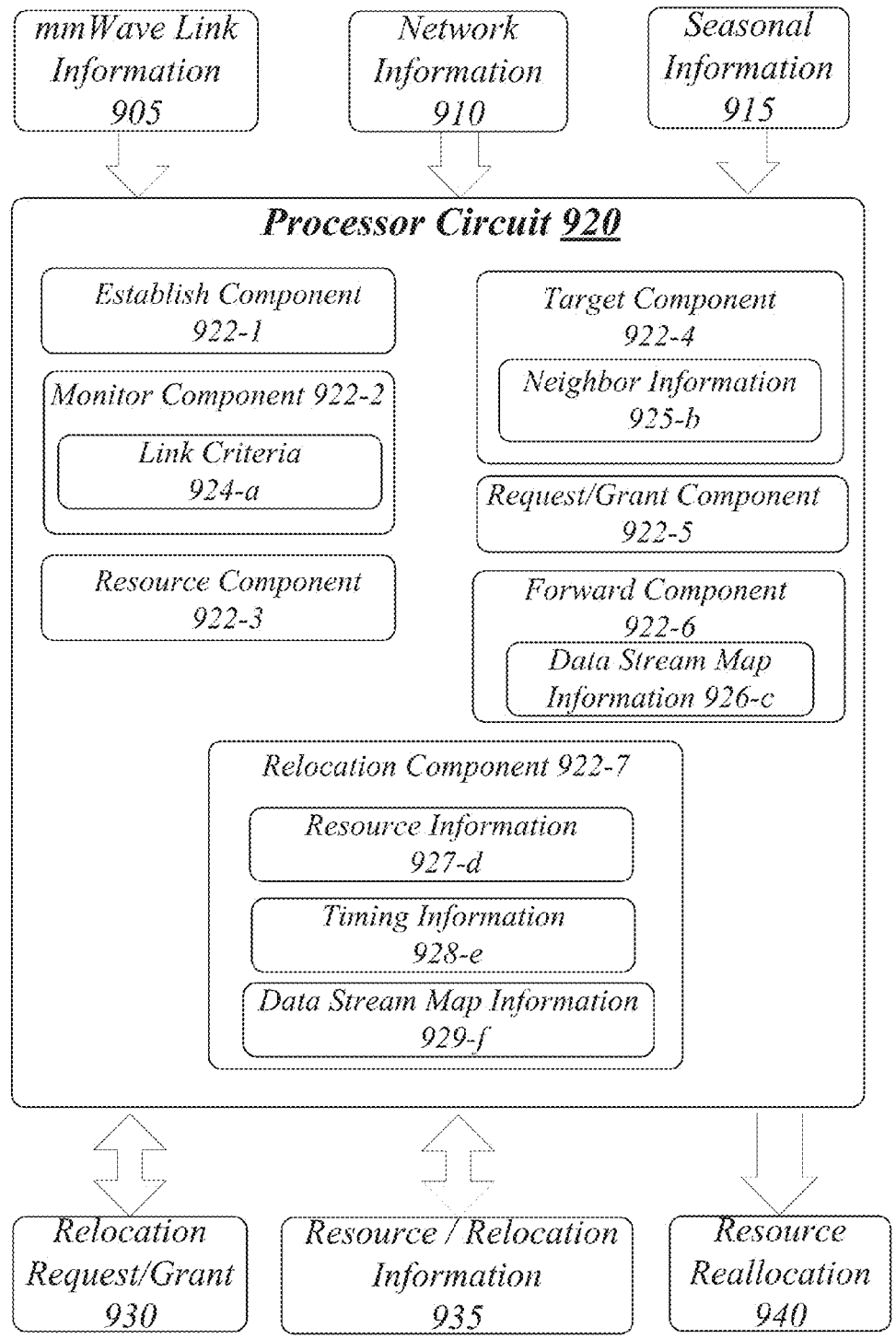
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-*a*. It is worthy to note that "a" and "b" and "c" and similar designators as used herein are intended to be variables representing any positive integer. Thus, for example, if an implementation sets a value for a=7, then a complete set of software components 922-*a* may include components 922-1, 922-2, 922-3, 922-4, 922-5, 922-6 and 922-7. The examples are not limited in this context.

According to some examples, apparatus 900 may be located with system equipment (e.g., located at or with a base station), such as network equipment for a communications system or network compliant with one or more 3GPP LTE Specifications or IEEE 802.11 Specification such as IEEE 802.11 ad. For example, apparatus 900 may be implemented as part of a macro cell or anchor base station for an LTE and/or IEEE 802.11ad compliant wireless network. Although some examples are described with reference to a macro cell or anchor base station, examples may utilize any network equipment for a communications system or network. The examples are not limited in this context.

In some examples, as shown in FIG. 9, apparatus 900 includes processor circuit 920. Processor circuit 920 may be generally arranged to execute one or more software components 922-a. The processing circuit 920 can be any of various commercially available processors to include, but not limited to the processors mentioned above for apparatus 600. Also, according to some examples, processor circuit 920 may also be an ASIC and at least some components 922-a may be implemented as hardware elements of the ASIC.

According to some examples, apparatus 900 may include an establish component 922-1. Establish component 922-1 may be executed by processor circuit 920 to establish a backhaul channel between a small cell base station and a macro cell base station that includes an apparatus 900. For these examples, the backhaul channel may be established over a first wireless link such as a first mmWave wireless link.

In some examples, apparatus 900 may also include a monitor component 922-2. Monitor component 922-2 may be executed by processor circuit 920 to monitor conditions associated with the first wireless link. For these examples, monitor component 922-2 may maintain link criteria 924-a in a data structure such as a LUT. Link criteria 924-a may be associated with one or more QoS requirements (e.g., data throughputs, latency, available capacity, etc.) or other criteria that changing conditions may cause the requirements to not be met or potentially not met. The changing conditions may be received or monitored via mmWave link information 905, network information 910 or seasonal information 915 and may include but are not limited to line-of-site blockage to the small cell base station, increased latencies due to NW congestion, high levels of measured interference or environmental conditions such as changing weather (e.g., rain or seasonal changes)

In some examples, apparatus 900 may also include a resource component 922-3. Resource component 922-3 may be executed by processor circuit 920 to determine whether adequate resources are available to support the backhaul channel over the first wireless link. In some examples, a data capacity threshold to a network core may be exceeded and that may cause a reduction in the overall resources available to the entire macro cell served by the macro cell base station. Also UEs being served directly by the macro cell base station or other small cells may consume resources to a point where the first wireless link may no longer be adequate for the backhaul channel.

In some examples, apparatus 900 may also include a target component 922-4. Target component 922-4 may be executed by processor circuit 920 to identify a target macro cell base station via which a second mmWave wireless link may be established for the backhaul channel. For these examples, target component 922-4 may maintain neighbor information 925-b in a data structure such as LUT and use neighbor information 925-b to identify the target.

According to some examples, apparatus 900 may also include a request/grant component 922-5. Request/Grant component 922-5 may be executed by processor circuit 920 to make a relocation request to the target identified by target component 922-3. The request message may be included in relocation request/grant 630. In some examples request/grant component 922-5 may also be capable of accepting a grant (if resources available) from either a different small cell base station or a neighboring macro cell base station to support a relocated backhaul link over a new wireless link for the different small cell base station.

In some examples, apparatus 900 may also include a forward component 922-6. Forward component 922-6 may be executed by processor circuit 920 to forward a copy of a backhaul data stream currently mapped to the first mmWave wireless link. For these examples, forward component 922-6 may at least temporarily include data stream map information for the first mmWave wireless link in data stream map information 926-c that may be maintained in a data structure such as a LUT. The backhaul data stream may be forwarded via an X2 interface/link to the identified target macro cell base station following the acceptance of the relocation of the backhaul channel.

In some examples, apparatus 900 may also include a relocation component 922-7. Relocation component 922-7 may be executed by processor circuit 920 to receive resource allocation and timing information from the identified target macro cell base station. Relocation component 922-7 may maintain resource information 926-c (e.g., in a LUT) that may indicate the amount of resources needed to support the backhaul channel for the small cell base station. If the handover/relocation information does not indicate adequate resources, relocation component 922-7 may not forward handover/relocation information to the small cell base station. If resources are adequate, relocation component 922-7 may at least temporarily maintain timing information 928-e (e.g., in a LUT) that includes absolute or relative timing information for the handover/relocation to the second mmWave wireless link and also may forward other received handover/relocation information via resource/relocation information 935.

In some examples, where the macro cell base station including apparatus 900 has accepted a relocation of a backhaul channel for a different small cell base station, relocation component 922-7 may also receive data stream map information from the requesting macro cell base station that includes data stream map information for a particular mmWave wireless link that may be in need of relocating. For these examples, relocation component 922-7 may include this data stream map information in data stream map information 929-f that may be maintained in a different LUT than the one maintained by forward component 922-6 for data stream map information 926-c.

According to some examples, resource component 922-3 may reallocate resources to other UEs or to other small cell base stations following a relocation of the first mmWave wireless link. For these examples, the resource reallocation may be included in resource reallocation 940 that notifies these other UEs and small cell base stations of the availability or reallocation of the resources.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by establish component 622-1, monitor component 622-2, resource component 622-3, target component 622-4, request/grant component 622-5, forward component 622-6 or relocation component 622-7.

In the illustrated example shown in FIG. 10, logic flow 1000 at block 1002 may establish a backhaul channel with a small cell base station over a first wireless link. In some examples, establish component 922-1 may establish backhaul channel over a first wireless link that is arranged as an mmWave wireless link.

In some examples, logic flow 1000 at block 1004 may receive an indication of relocation. For these examples, monitor component 922-2 may receive the indication. The indication may be based on monitored conditions of the first wireless link by either monitor component 922-2 or elements at the small cell base station (e.g. monitor component 622-2). Monitor component 922-2 may also receive the indication responsive to a determination by resource component 922-3 as to whether a data capacity threshold for a NW link to a network core has been exceeded. The indication may also be received from a NW core based on NW load balancing or other network management schemes that may result in a need for relocation.

According to some examples, logic flow 1000 at block 1006 may identify a relocation target. For these examples, target component 922-3 may identify the relocation target. In some other examples, the small cell base station may have identified the relocation target as a neighbor macro cell base station and then provided that target information to target component 922-3.

In some examples, logic flow 1000 at block 1008 may initiate relocation. For these examples, request/grant component 922-5 may initiate the relocation by sending a request to the identified relocation target that requests a relocation of the backhaul link.

According to some examples, logic flow 1000 at block 1010 may receive acceptance of relocation from the relocation target. For these examples, request/grant component 922-5 may receive the acceptance from a neighboring macro cell base station that has available resources to support relocation of the backhaul channel to a second mmWave wireless link.

In some examples, logic flow 1000 at block 1012 may forward a copy of a backhaul data stream to the relocation target. For these examples, forward component 922-6 may forward the backhaul data stream.

According to some examples, logic flow 1000 at block 1014 may receive resource allocation and timing information and forward that information to the small cell base station. For these examples, forward component 922-6 may forward this information.

In some examples, logic flow 1000 at block 1016 may terminate the first wireless link. For these examples, relocation component 922-7 may terminate the first mmWave wireless link based on the timing information received from the neighboring macro cell base station that now supports the backhaul channel over the second mmWave wireless link.

According to some examples, logic flow 1000 at block 1018 may reallocate resources. For these examples, resource component 922-1 may reallocate the resources previously used to support the backhaul channel over the first mmWave wireless link.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
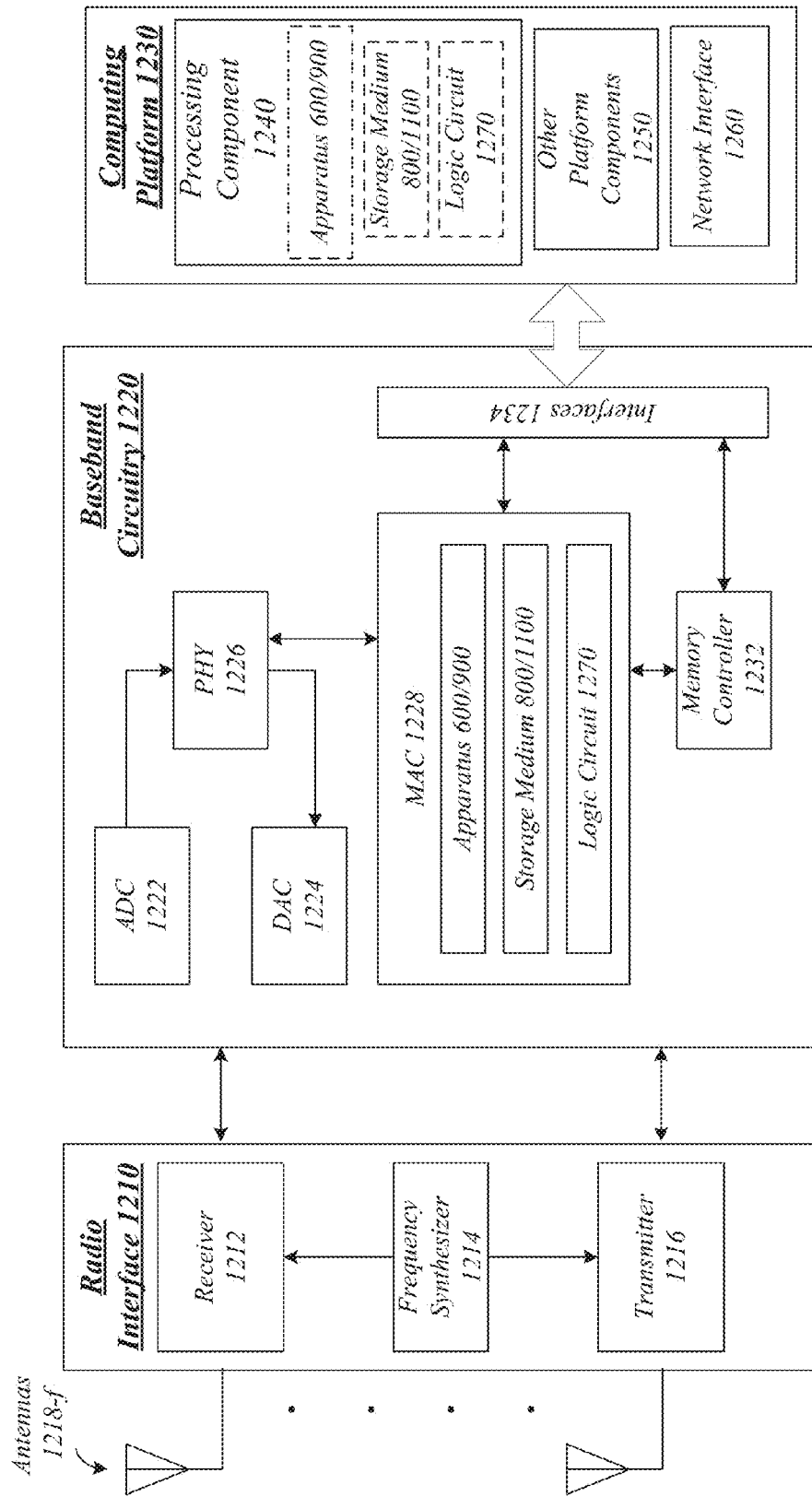
FIG. 12 illustrates an example of a device.

FIG. 12 illustrates an embodiment of a device 1200 for use in a broadband wireless access network. Device 1200 may implement, for example, apparatus 600, storage medium 1000 and/or a logic circuit 1270. The logic circuit 1270 may include physical circuits to perform operations described for apparatus 600 or apparatus 900. As shown in FIG. 12, device 1200 may include a radio interface 1210, baseband circuitry 1220, and computing platform 1230, although examples are not limited to this configuration.

The device 1200 may implement some or all of the structure and/or operations for the apparatus 600/900, storage medium 800/1100 and/or logic circuit 1270 in a single computing entity, such as entirely within a single device. Alternatively, the device 1200 may distribute portions of the structure and/or operations for apparatus 600/900, storage medium 800/1100 and/or logic circuit 1270 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-f. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-toanalog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 600/900, storage medium 800/1100, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support an X2 interface as described in one or more 3GPP LTE or LTE-A specifications or standards. For these examples, network interface 1260 may enable an apparatus 900 located at a base station to communicatively couple to one or more other base stations via an X2 communication channel. In some other examples, network interface 1260 may include logic and/or features to support other communication interface described in the one or more 3GPP LTE/LTE-A or IEEE 802.11ad specifications. For these examples, network interface 1260 may enable an apparatus 600/900 located with a base station to communicatively couple to one or more other base stations or UEs via different types of wireless communications links.

Device 1200 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
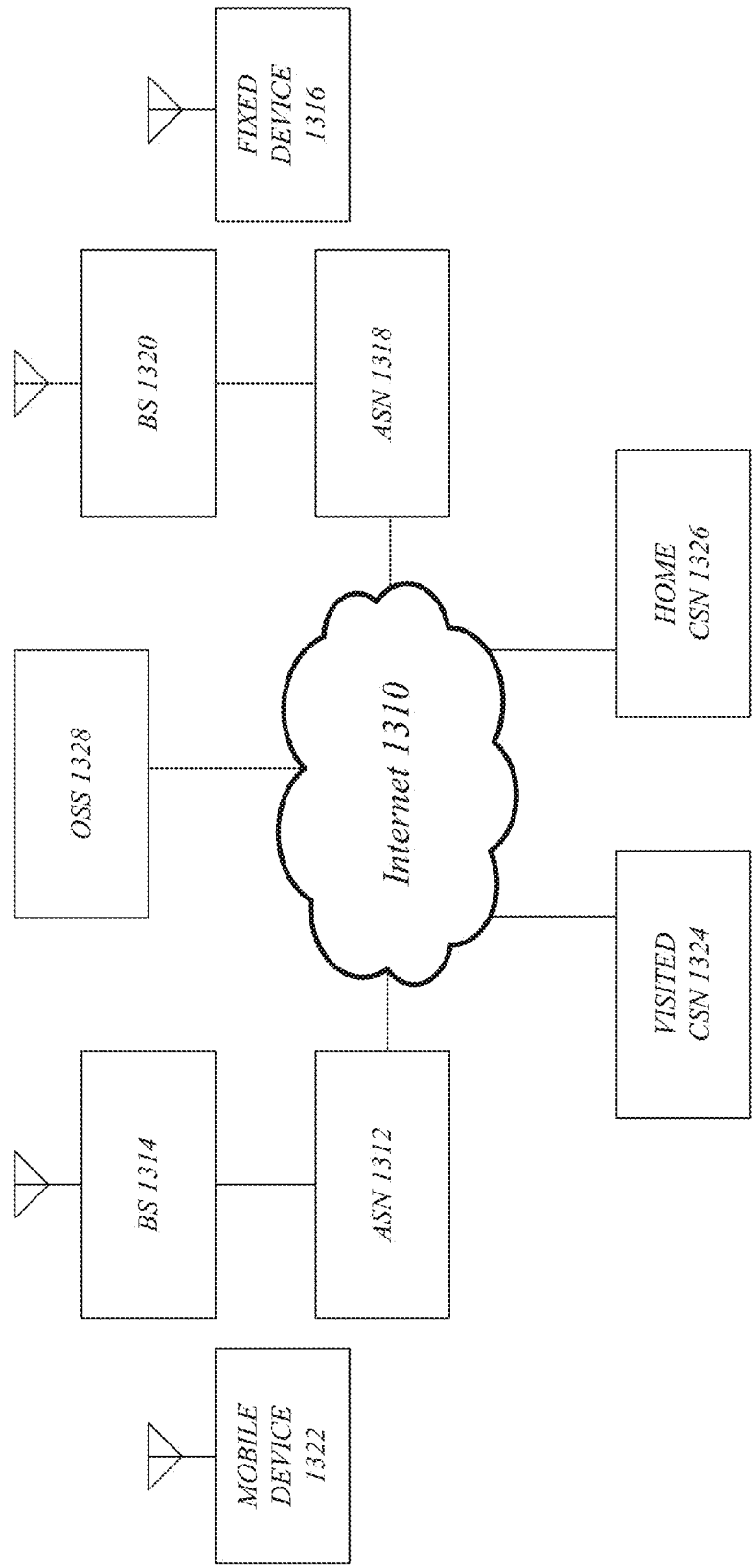
FIG. 13 illustrates an example of a broadband wireless access system.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1300, access service networks (ASN) 1314, 1318 are capable of coupling with base stations (BS) 1314, 1320 (RRHs or eNBs), respectively, to provide wireless communication between one or more fixed devices 1316 and internet 1310, or one or more mobile devices 1322 and Internet 1310. One example of a fixed device 1316 and a mobile device 1322 is UE 120-1, with the fixed device 1316 comprising a stationary version of UE 120-1 and the mobile device 1322 comprising a mobile version of UE 120-1. ASN 1312 may implement profiles that are capable of defining the mapping of network functions to one or more physical entities on broadband wireless access system 1300. Base stations 1314, 1320 (or eNBs) may comprise radio equipment to provide RF communication with fixed device 1316 and mobile device 1322, such as described with reference to device 1300, and may comprise, for example, the PHY, MAC, RLC or PDCP layer equipment in compliance with a 3GPP LTE Specification or an IEEE 802.16 Standard. Base stations 1314, 1320 (or eNBs) may further comprise an IP backplane to couple to Internet 1310 via ASN 1312, 1318, respectively, although the scope of the claimed subject matter is not limited in these respects.

Broadband wireless access system 1300 may further comprise a visited connectivity service network (CSN) 1324 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1324 or home CSN 1326, and the scope of the claimed subject matter is not limited in these respects. Visited CSN 1324 may be referred to as a visited CSN in the case where visited CSN 1324 is not part of the regular service provider of fixed device 1316 or mobile device 1322, for example where fixed 1316 or mobile device 1322 is roaming away from their respective home CSN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322.

Fixed device 1316 may be located anywhere within range of one or both base stations 1314, 1320, such as in or near a home or business to provide home or business customer broadband access to Internet 1310 via base stations 1314, 1320 and ASN 1312, 1318, respectively, and home CSN 1326. It is worthy to note that although fixed device 1316 is generally disposed in a stationary location, it may be moved to different locations as needed. Mobile device 1322 may be utilized at one or more locations if mobile device 1322 is within range of one or both base stations 1314, 1320, for example.

In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

In some examples, an example first apparatus may include a processor circuit for a small cell base station. The first apparatus may also include an establishment component for execution by the processor circuit that may establish a backhaul channel between the small cell base station and a first macro cell base station over a first wireless link. The first apparatus may also include a monitor component for execution by the processor circuit that may receive an indication that the backhaul channel is to be relocated over a second wireless link with the first macro cell base station or with a second macro cell base station. The first apparatus may also include a relocation component for execution by the processor circuit that ay relocate the backhaul channel over the second wireless link based, at least in part, on one or more handover procedures.

According to some examples for the first apparatus, the first and second wireless links may include mmWave wireless links arranged to transmit signals in a 57-64 GHz or 20-30 GHz radio frequency band.

In to some examples for the first apparatus, the monitor component may monitor one or more conditions of the first wireless link. The one or more condition may include a data throughput for the first wireless link, or a change in an environmental condition, the indication that the backhaul channel is to be relocated is received responsive to the monitor component receiving an indication that the data throughput has fallen below a threshold level or a change in the environmental condition is expected to cause the throughput to fall below the threshold level.

According to some examples, the first apparatus may also include a target component for execution by the processor circuit. For these examples, the target component may identify a relocation target for the relocation based on the relocation target being included in a list of acceptable relocation targets previously determined as being capable of supporting a given wireless link for the backhaul channel with the small cell base station.

In some examples, the first apparatus may also include a request component for execution by the processor circuit to send a relocation request to the relocation target to initiate the relocation to the second wireless link. For these examples, the relocation request may include an identification for the small cell base station, capability information for the small cell base station or radio resources needed by the small cell base station to support one or more user equipment (UEs) served by the small cell base station. Also, for these examples, the relocation component may receive a grant for the relocation request from the relocation target and receive relocation information to facilitate relocation of the backhaul channel on the second wireless link.

According to some examples for the first apparatus, the relocation information may include resources to be allocated by the relocation target to support the backhaul channel on the second wireless link. For these examples, relocation information may also include timing information for the relocation or tracking area information for use by one or more UEs served by the first small cell base station following relocation of the backhaul channel to the second wireless link.

In some examples for the first apparatus, the relocation component may provide the tracking area information to the one or more UEs following the relocation of the backhaul channel to the second wireless link.

According to some examples for the first apparatus, the first and the second macro cell base stations may be operated in compliance with one or more 3GPP LTE standards including LTE-A.

In some examples for the first apparatus, the first and the second macro cell base stations being operated as eNBs.

According to some examples, the first apparatus may also include a digital display coupled to the processor circuit to present a user interface view.

In some examples, an example second apparatus may include a processor circuit for a first macro cell base station. The second apparatus may also include an establishment component for execution by the processor circuit that may establish a first backhaul channel between the first macro cell base station and a small cell base station over a first wireless link. The second apparatus may also include a monitor component for execution by the processor circuit that may receive an indication that the first backhaul channel is to be relocated over a second wireless link with a second macro cell base station. The second apparatus may also include a relocation component for execution by the processor circuit that may relocate the first backhaul channel over the second wireless link based, at least in part, on one or more handover procedures.

According to some examples for the second apparatus, the first and second wireless links comprising mmWave wireless links arranged to transmit signals in a 57-64 GHz or 20-30 GHz radio frequency band.

In some examples for the second apparatus, the monitor component may monitor one or more conditions of the first wireless link. For these examples, the one or more conditions may include a data throughput for the first wireless link, or a change in an environmental condition. Also, for these examples, the indication that the backhaul channel is to be relocated is received responsive to the monitor component determining that the data throughput has fallen below a threshold level or a change in the environmental condition is expected to cause the throughput to fall below the threshold level.

According to some examples, the second apparatus may also include a resource component for execution by the processor circuit to determine whether a data capacity threshold for a network link between the first macro cell base station and a network core has been exceeded. For these examples, the monitor component may receive the indication that the first backhaul channel is to be relocated from the resource component if the data capacity threshold has been exceeded.

In some examples for the second apparatus, the monitor component may receive the indication that the first backhaul channel is to be relocated from a network core coupled to the first macro cell base station. For these examples, the indication may be received responsive to network load balancing or a network management scheme.

According to some examples, the second apparatus may also include a target component for execution by the processor circuit to identify the second macro cell base station for the relocation based on the second macro cell base station being included in a list of acceptable relocation targets previously determined as being capable of supporting a given wireless link for the backhaul channel with the small cell base station.

In some examples, the second apparatus may also include a request component for execution by the processor circuit to send a relocation request to the second macro cell base station to initiate the relocation to the second wireless link. For these examples, the relocation request may include an identification for the small cell base station, capability information for the small cell base station or radio resources needed by the small cell base station to support one or more UEs served by the small cell base station. Also, for these examples, the relocation component may receive a grant for the relocation request from the second macro cell base station and receive relocation information to facilitate relocation of the backhaul channel on the second wireless link. The second apparatus may also include a forward component for execution by the processor circuit to forward a copy of a backhaul data stream mapped to the first wireless link to the second macro cell base station. The second macro cell may then map the backhaul data stream to the second wireless link following relocation. Also, the forward component may forward the relocation information to the small cell base station.

According to some examples for the second apparatus, the relocation information may include resources to be allocated by the second macro cell base station to support the backhaul channel on the second wireless link, timing information for the relocation or tracking area information for use by one or more UEs served by the first small cell base station following relocation of the backhaul channel to the second wireless link.

In some examples for the second apparatus, the first and the second macro cell base stations being operated in compliance with one or more 3GPP LTE standards including LTE-A.

According to some examples for the second apparatus, the first and the second macro cell base stations may be operated as eNBs.

In some examples, the second apparatus may also include a digital display coupled to the processor circuit to present a user interface view.

According to some examples, an example first at least one tangible machine readable medium may include a plurality of instructions that in response to being executed on a system for a small cell base station cause the system to establish a backhaul channel between the small cell base station and a first macro cell base station over a first wireless link. The instruction may also cause the system to receive an indication that the backhaul channel is to be relocated over a second wireless link with the first macro cell base station or with a second macro cell base station. The instruction may also cause the system to relocate the backhaul channel over the second wireless link based, at least in part, on one or more handover procedures.

In some examples for the first at least one machine readable medium, the first and second wireless links may include mmWave wireless links arranged to transmit signals in a 57-64 GHz or 20-30 GHz radio frequency band.

According to some examples for the first at least one machine readable medium, the indication that the backhaul channel is to be relocated may be received responsive to receiving an indication that a data throughput for the first wireless link has fallen below a threshold level or a change in the environmental condition is expected to cause the throughput to fall below the threshold level.

In some examples for the first at least one machine readable medium, the instructions may further cause the system to identify a relocation target for the relocation based on the relocation target being included in a list of acceptable relocation targets previously determined as being capable of supporting a given wireless link for the backhaul channel with the small cell base station.

According to some examples for the first at least one machine readable medium, the instructions may further cause the system to send a relocation request to the relocation target to initiate the relocation to the second wireless link. For these examples, the relocation request may include an identification for the small cell base station, capability information for the small cell base station or radio resources needed by the small cell base station to support one or more UEs served by the small cell base station. Also, for these examples, the instructions may cause the system to receive a grant for the relocation request from the relocation target and receive relocation information to facilitate relocation of the backhaul channel on the second wireless link.

In some examples for the first at least one machine readable medium, the relocation information may include resources to be allocated by the relocation target to support the backhaul channel on the second wireless link. For these examples, the relocation information may also include timing information for the relocation or tracking area information for use by one or more UEs served by the first small cell base station following relocation of the backhaul channel to the second wireless link.

According to some examples for the first at least one machine readable medium, the instructions may further cause the system to provide the tracking area information to the one or more UEs following the relocation of the backhaul channel to the second wireless link.

According to some examples, an example second at least one tangible machine readable medium may include a plurality of instructions that in response to being executed on a system for a macro cell base station cause the system to establish a first backhaul channel between the first macro cell base station and a small cell base station over a first wireless link. The instructions may also cause the system to receive an indication that the first backhaul channel is to be relocated over a second wireless link with a second macro cell base station. The instructions may also cause the system to relocate the first backhaul channel over the second wireless link based, at least in part, on one or more handover procedures.

In some examples for the second at least one machine readable medium, the first and second wireless links may include mmWave wireless links arranged to transmit signals in a 57-64 GHz or 20-30 GHz radio frequency band.

According to some examples for the second at least one machine readable medium, the instructions may further cause the system to monitor one or more conditions of the first wireless link. The one or more conditions may include a data throughput for the first wireless link, or a change in an environmental condition. For these examples, the indication that the backhaul channel is to be relocated may be received responsive to determining that the data throughput has fallen below a threshold level or a change in the environmental condition is expected to cause the throughput to fall below the threshold level.

In some examples for the second at least one machine readable medium, the instructions may further cause the system to determine whether a data capacity threshold for a network link between the first macro cell base station and a network core has been exceeded. The instructions may also cause the system to receive the indication that the first backhaul channel is to be relocated from the resource component if the data capacity threshold has been exceeded.

According to some examples for the second at least one machine readable medium, the instruction may further cause the system to receive the indication that the first backhaul channel is to be relocated from a network core coupled to the first macro cell base station. For these examples, the indication may be received responsive to network load balancing or a network management scheme.

In some examples for the second at least one machine readable medium, the instruction may further cause the system to identify the second macro cell base station for the relocation based on the second macro cell base station being included in a list of acceptable relocation targets previously determined as being capable of supporting a given wireless link for the backhaul channel with the small cell base station.

According to some examples for the second at least one machine readable medium, the instruction may further cause the system to send a relocation request to the second macro cell base station to initiate the relocation to the second wireless link. For these examples, the relocation request may include an identification for the small cell base station, capability information for the small cell base station or radio resources needed by the small cell base station to support one or more UEs served by the small cell base station. Also, for these examples, the instructions may also cause the system to receive a grant for the relocation request from the second macro cell base station and receive relocation information to facilitate relocation of the backhaul channel on the second wireless link. Also, for these examples, the instructions may also cause the system to forward a copy of a backhaul data stream mapped to the first wireless link to the second macro cell base station for the second macro cell to map the backhaul data stream to the second wireless link following relocation. Also, for these examples, the instructions may also cause the system forward the relocation information to the small cell base station.

In some examples for the second at least one machine readable medium, the relocation information may include resources to be allocated by the second macro cell base station to support the backhaul channel on the second wireless link, timing information for the relocation or tracking area information for use by one or more UEs served by the first small cell base station following relocation of the backhaul channel to the second wireless link.

In some examples, an example method may include establishing a first backhaul channel between a small cell base station and a first macro cell base station over a first wireless link. The example method may also include receiving an indication that the first backhaul channel is to be relocated over a second wireless link with the first macro cell base station or with a second macro cell base station and relocating the first backhaul channel over the second wireless link based, at least in part, on one or more handover procedures.

According to some examples, the example method may also include terminating the first wireless link and then reallocating radio resources at the first macro cell base station previously used to support the first wireless link.

In some examples for the example method, the first and second wireless links may include mmWave wireless links arranged to transmit signals in a 57-64 GHz or 20-30 GHz radio frequency band.

According to some examples for the example method, the first wireless link may be coupled to a relay station between the small cell base station and the first macro cell station. For these examples, the first backhaul channel may be established between the small cell base station and the first macro cell base station over the first wireless link that couples to the relay station and over a third wireless link that couples the relay station to the macro cell base station.

In some examples for the example method, the second wireless link may couple the first macro cell base station directly to small cell base station.

According to some examples for the example method, the one or more handover procedures may include the small cell base station initiating the relocation.

In some examples for the example method, the small cell base station may initiate the relocation based on a monitored condition of the first wireless link. The monitored condition may include a data throughput for the first wireless link falling below a threshold level or a change in an environmental condition that is expected to cause the first wireless link to fall below the threshold level.

According to some examples for the example method, the small cell base station to initiate the relocation may include the small cell base station sending a relocation request to the second macro cell base station via an RACH burst.

In some examples for the example method, the relocation request may include an identification for the small cell base station, capability information for the small cell base station or radio resources needed by the small cell base station to support one or more UEs served by the small cell base station.

According to some examples for the example method, the second macro cell base station may grant the relocation request and provide a notification to the first macro cell base station via a second backhaul channel between the second macro cell base station and the first macro cell base station that the first backhaul channel is to be relocated from the first wireless link to the second wireless link. For these examples, the notification may include a time reference for the relocation.

In some examples, the example method may also include forwarding a copy of a backhaul data stream currently mapped to the first wireless link from the first macro cell base station to the second macro cell base station via the second backhaul channel to enable the second macro cell base station to complete the relocation of the first backhaul channel over the second wireless link.

According to some examples for the example method, the one or more handover procedures may include the first macro cell base station to initiate the relocation.

In some examples for the example method, the first macro cell base station may initiate the relocation based on exceeding a load capacity threshold for the first macro cell base station to service UEs or other small cell base stations within a first macro cell served by the first macro cell base station.

According to some examples for the example method, the first macro cell base station may initiate the relocation responsive to an environmental condition that is expected to cause the first wireless link to fall below a threshold level for a data throughput or the data throughput for the first wireless link is expected to fall below the threshold level due to a scheduled reduction in capacity allocated to the small cell base station.

In some examples for the example method, the first macro cell base station may initiate relocation via a relocation request sent to the second macro cell base via a second backhaul communication link between the first macro cell base station and the second macro cell base station. For these examples, the second macro cell base station may grant the relocation request and provide a notification to the first macro cell base station via the second backhaul channel that the first backhaul channel is to be relocated from the first wireless link to the second wireless link. The notification may include timing information for the relocation and a copy of a backhaul data stream currently mapped to the first wireless link from the first macro cell base station to the second macro cell base station via the second backhaul channel to enable the second macro cell base station to relocate the first backhaul channel over the second wireless link using the copy of the backhaul data stream.

According to some examples, the example method may include identifying the second macro cell base station as a relocation target for the second wireless link based on the second macro cell base station being included in a list of acceptable relocation targets previously determined as being capable of supporting a given wireless link for a given backhaul channel with the small cell base station.

In some examples for the example method, the list of acceptable relocation targets may be maintained by one of the first macro cell base station, the small cell base station or a network core coupled to the first macro cell base station.

According to some examples for the example method, the first and the second macro cell base stations being operated in compliance with one or more 3GPP LTE standards including LTE-A.

In some examples for the example method, the first and the second macro cell base stations may be operated as eNBs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor circuit for a small cell base station;
an establishment component for execution by the processor circuit to establish a backhaul channel between the small cell base station and a first macro cell base station over a first wireless link;
a monitor component for execution by the processor circuit to receive an indication that the backhaul channel is to be relocated over a second wireless link with the first macro cell base station or with a second macro cell base station; and
a relocation component for execution by the processor circuit to:
receive relocation information comprising resources to be allocated by the second macro cell base station to support the backhaul channel on the second wireless link, timing information for the relocation or tracking area information for use by one or more user equipment (UEs) served by the first small cell base station following relocation of the backhaul channel to the second wireless link,
forward the relocation information to the small cell base station, and
relocate the backhaul channel over the second wireless link based, at least in part, on one or more handover procedures.

2. The apparatus of claim 1, the first and second wireless links comprising millimeter wave (mmWave) wireless links arranged to transmit signals in a 57-64 gigahertz (GHz) or 20-30 GHz radio frequency band.

3. The apparatus of claim 1, comprising:
a target component for execution by the processor circuit to identify a relocation target for the relocation based on the relocation target being included in a list of acceptable relocation targets previously determined as being capable of supporting a given wireless link for the backhaul channel with the small cell base station.

4. The apparatus of claim 3, comprising:
a request component for execution by the processor circuit to send a relocation request to the relocation target to initiate the relocation to the second wireless link, the relocation request to include an identification for the small cell base station, capability information for the small cell base station or radio resources needed by the small cell base station to support one or more user equipment (UEs) served by the small cell base station; and
the relocation component to receive a grant for the relocation request from the relocation target and receive the relocation information to facilitate relocation of the backhaul channel on the second wireless link.

5. The apparatus of claim 1, comprising the first and the second macro cell base stations being operated in compliance with one or more 3rd Generation Partnership Project (3GPP) Long Term Evolution (LTE) standards including LTE-Advanced (LTE-A).

6. The apparatus of claim 5, comprising the first and the second macro cell base stations being operated as evolved node Bs (eNBs).

7. The apparatus of claim 1, comprising a digital display coupled to the processor circuit to present a user interface view.

8. At least one tangible non-transitory machine readable medium comprising a plurality of instructions that in response to being executed on a system for a first macro cell base station causes the system to:
establish a first backhaul channel between the first macro cell base station and a small cell base station over a first wireless link;
receive an indication that the first backhaul channel is to be relocated over a second wireless link with a second macro cell base station;
receive relocation information comprising resources to be allocated by the second macro cell base station to support the backhaul channel on the second wireless link, timing information for the relocation or tracking area information for use by one or more user equipment (UEs) served by the first small cell base station following relocation of the backhaul channel to the second wireless link;
forward the relocation information to the small cell base station; and
relocate the first backhaul channel over the second wireless link based, at least in part, on one or more handover procedures.

9. The at least one tangible non-transitory machine readable medium of claim 8, the first and second wireless links comprising millimeter wave (mmWave) wireless links arranged to transmit signals in a 57-64 gigahertz (GHz) or 20-30 GHz radio frequency band.

10. The at least one tangible non-transitory machine readable medium of claim 8, comprising the instructions to further cause the system to monitor one or more conditions of the first wireless link that includes a data throughput for the first wireless link, or a change in an environmental condition, the indication that the backhaul channel is to be relocated is received responsive to determining that the data throughput has fallen below a threshold level or a change in the environmental condition is expected to cause the throughput to fall below the threshold level.

11. The at least one tangible non-transitory machine readable medium of claim 8, comprising the instructions to further cause the system to:
determine whether a data capacity threshold for a network link between the first macro cell base station and a network core has been exceeded; and
receive the indication that the first backhaul channel is to be relocated from the resource component if the data capacity threshold has been exceeded.

12. The at least one tangible non-transitory machine readable medium of claim 8, comprising the instruction to further cause the system to receive the indication that the first backhaul channel is to be relocated from a network core coupled to the first macro cell base station, the indication received responsive to network load balancing or a network management scheme.

13. The at least one tangible non-transitory machine readable medium of claim 8, comprising the instruction to further cause the system to:
send a relocation request to the second macro cell base station to initiate the relocation to the second wireless link, the relocation request to include an identification for the small cell base station, capability information for the small cell base station or radio resources needed by the small cell base station to support one or more user equipment (UEs) served by the small cell base station;
receive a grant for the relocation request from the second macro cell base station and receive the relocation information to facilitate relocation of the backhaul channel on the second wireless link; and
forward a copy of a backhaul data stream mapped to the first wireless link to the second macro cell base station for the second macro cell to map the backhaul data stream to the second wireless link following relocation.

14. A method comprising:
establishing a first backhaul channel between a small cell base station and a first macro cell base station over a first wireless link;
receiving an indication that the first backhaul channel is to be relocated over a second wireless link with the first macro cell base station or with a second macro cell base station;
receiving relocation information comprising resources to be allocated by the second macro cell base station to support the first backhaul channel on the second wireless link, timing information for the relocation or tracking area information for use by one or more user equipment (UEs) served by the small cell base station following relocation of the first backhaul channel to the second wireless link;
communicating the relocation information to the small cell base station; and
relocating the first backhaul channel over the second wireless link based, at least in part, on one or more handover procedures.

15. The method of claim 14, comprising:
terminating the first wireless link; and
reallocating radio resources at the first macro cell base station previously used to support the first wireless link.

16. The method of claim 14, the first and second wireless links comprising millimeter wave (mmWave) wireless links arranged to transmit signals in a 57-64 gigahertz (GHz) or 20-30 GHz radio frequency band.

17. The method of claim 14, comprising the first wireless link coupled to a relay station between the small cell base station and the first macro cell station, the first backhaul channel established between the small cell base station and the first macro cell base station over the first wireless link that couples to the relay station and over a third wireless link that couples the relay station to the macro cell base station.

18. The method of claim 17, the second wireless link to couple the first macro cell base station directly to small cell base station.

19. The method of claim 14, the one or more handover procedures comprising the small cell base station initiating the relocation by sending a relocation request to the second macro cell base station via a random access channel (RACH) burst.

20. The method of claim 19, comprising the small cell base station to initiate the relocation based on a monitored condition of the first wireless link that includes a data throughput for the first wireless link falling below a threshold level or a change in an environmental condition that is expected to cause the first wireless link to fall below the threshold level.

21. The method of claim 19, comprising the relocation request to include an identification for the small cell base station, capability information for the small cell base station or radio resources needed by the small cell base station to support one or more user equipment (UEs) served by the small cell base station.

22. The method of claim 19, comprising the second macro cell base station to grant the relocation request and provide a notification to the first macro cell base station via a second backhaul channel between the second macro cell base station and the first macro cell base station that the first backhaul channel is to be relocated from the first wireless link to the second wireless link.

23. The method of claim 14, comprising the one or more handover procedures comprising the first macro cell base station to initiate the relocation.

24. The method of claim 23, comprising the first macro cell base station initiating relocation via a relocation request sent to the second macro cell base via a second backhaul channel between the first macro cell base station and the second macro cell base station, the second macro cell base station to grant the relocation request and provide a notification to the first macro cell base station via the second backhaul channel that the first backhaul channel is to be relocated from the first wireless link to the second wireless link, the notification to include a copy of a backhaul data stream currently mapped to the first wireless link from the first macro cell base station to the second macro cell base station via the second backhaul channel to enable the second macro cell base station to relocate the first backhaul channel over the second wireless link using the copy of the backhaul data stream.

* * * * *